United States Patent [19]

Malthouse et al.

[11] 4,448,629

[45] May 15, 1984

[54] CUTTER ASSEMBLY

[75] Inventors: Martin D. Malthouse, Toronto; Heinz K. Groeger, Thornhill, both of Canada

[73] Assignee: Associpak International Inc., Markham, Canada

[21] Appl. No.: 321,004

[22] Filed: Nov. 13, 1981

Related U.S. Application Data

[62] Division of Ser. No. 98,085, Nov. 28, 1978, Pat. No. 4,323,416.

[30] Foreign Application Priority Data

| | | | |
|---|---|---|---|
| Dec. 5, 1978 | [CA] | Canada | 317428 |
| Nov. 22, 1979 | [CA] | Canada | 340448 |

[51] Int. Cl.3 .......... B32B 31/18

[52] U.S. Cl. .......... 156/510; 83/175; 83/349; 156/517; 156/521

[58] Field of Search .......... 156/510, 516, 517, 519, 156/521, 556, 566, 494; 83/175, 176, 321, 322, 349, 491, 500, 508

[56] References Cited

U.S. PATENT DOCUMENTS

| | | | |
|---|---|---|---|
| 2,372,020 | 3/1945 | Sandberg | 83/349 |
| 3,226,282 | 12/1965 | Jackson | 156/519 |
| 3,957,570 | 5/1976 | Helm | 156/521 |
| 4,108,710 | 8/1978 | Hoffmann | 156/521 |

*Primary Examiner*—Caleb Weston
*Attorney, Agent, or Firm*—Hirons, Rogers & Scott

[57] ABSTRACT

Labelling equipment is provided for applying wrap-around labels to cylindrical containers. The equipment includes a label carrier having a wheel rotatable about its axis, a vacuum system coupled to the wheel to retain labels on the wheel, a feeder for directing containers individually to the wheel adjacent the periphery of the wheel to receive a label, and a drive system for receiving containers from the bottle feeder and for rolling the containers upon receiving the label from the label carrier. The drive system includes at least one belt engaged about the wheel in slipping relationship therewith to permit the belt to move faster than the periphery of the wheel and including a portion for moving in contact with the container immediately after the container leaves the feeder to both carry the label off the wheel and to engage it on the container. A cutter arrangement is provided with a lobe which removes tension from the label as it is severed from the strip of labels.

13 Claims, 7 Drawing Figures

CUTTER ASSEMBLY

This application is a division of U.S. application Ser. No. 098,085, filed Nov. 28, 1979, now U.S. Pat. No. 4,323,416.

This invention relates to labelling equipment for applying labels to cylindrical portions of containers such as bottles and more particularly to equipment for applying labels that wrap around the outer surface of the container.

It is well known to utilize mechanical handling equipment to apply labels to a container or the like. Such equipment usually includes a drum upon which the label is secured and which moves the label into engagement with the outer surface of the container. The label adheres to the container and is subsequently wrapped around the container by rolling it along a fixed surface.

The general improvement in labelling machines has resulted in increased use of rolls of labels which are individually severed as they are placed on the drum. The use of such rolls has avoided the problems associated with feeding individual precut labels from a batch, but some difficulty has been encountered in severing labels from the roll. Flying knife shears have been utilized, but these require accurate adjustment to prevent rapid wear of the cutting edge whilst ensuring the label is completely cut.

In our Canadian Pat. No. 951,685 there is disclosed a knife arrangement in which a stationary knife is inclined to the axis of rotation of a rotating knife to achieve a progressive cut across the width of the label. This arrangement has been successful in achieving complete cutting of the label without premature wear of the cutting edge. With this arrangement the label is engaged by a drum prior to severing and a tension induced in the label by rotating the drum at a greater peripheral speed than the feed rate of the label roll. It has now been found that the induced tension may cause the label to be torn from the roll as the knife approaches the end of its cutting action. This is due to the progressive reduction in width of unsevered paper which must resist the tension applied to the label. The tearing of the label is undesirable because of its appearance and because of the misregistration of the label on the drum.

According therefore to an aspect of the invention there is provided a cutter assembly to sever sheets of material from a strip moving along a predetermined path, the cutter assembly comprising a fixed support, a first knife element attached to the fixed support to extend transverse to the strip, a rotatable knife carrier mounted for rotation about a first axis, a second knife element attached to the rotatable knife carrier for movement therewith, drive means to rotate the rotatable knife carrier about the first axis and move the second knife element past the first knife element to produce a cutting action, the knife elements diverging in the direction of travel of the second knife element to provide progressive severing of the strip in a direction transverse to the strip, and cam means associated with the rotatable knife carrier and moveable into the path to engage the strip and during a latter part of the cutting action out of the path to disengage the strip whereby tension is removed from strip between the cutter assembly and the label carrier during the latter part of the cutting action.

In the preferred embodiment of the invention a cam Portion is mounted on a rotating knife holder to engage the label being severed from the roll. The cam portion is positioned ahead of the knife blade and moves out of engagement with the label as the knife blade approaches the end of its cut. The label is then slack as the cut is completed to avoid tearing of the label.

It is preferable to arrange the cutter assembly in a manner that permits easy adjustment and maintenance. However, since the various components must rotate in synchronism it has frequently been necessary to disengage drive components during maintenance.

An embodiment of the invention will now be described by way of example only with reference to the accompanying drawings in which:

FIG. 2 is a plan view having portions sectioned to show details of the labelling equipment;

The drawings illustrate labelling equipment capable of handling a strip of labels supplied on a spool, severing these labels individually, handling the labels and then applying them to bottles which are controlled and fed through the labelling equipment. Although the equipment is capable of use with various sizes of bottles, it is particularly designed for large bottles or other containers having cylindrical portions for receiving wrap-around labels. These labels tend to be unwieldy and therefore difficult to handle. Also, because of the length of the labels they tend to buckle or apply unevenly with unacceptable results. The present equipment controls the labels and applies them to the bottles while maintaining some tension in the labels. As a result the labels are applied evenly and positively to the bottles or containers.

Figure 1:
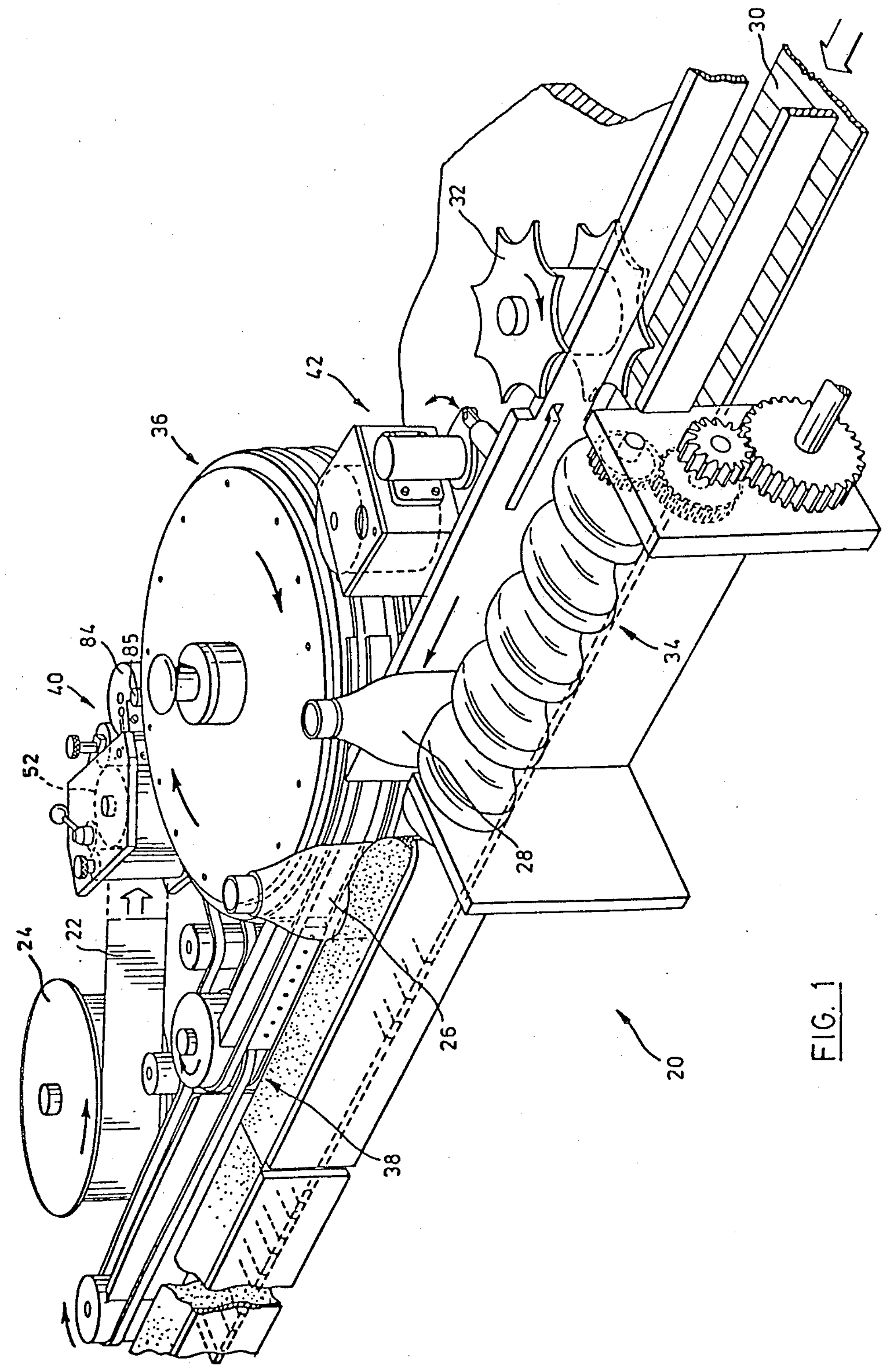
FIG. 1 is a perspective view of a preferred embodiment of labelling equipment looking generally from an end of the equipment from which bottles are fed to receive labels.

Reference is now made to FIG. 1 which illustrates a preferred embodiment of labelling equipment 20 for use in applying wrap-around labels to a cylindrical portion of large plastic bottles. Labels in the form of a strip or web 22 are fed from a spool 24 to meet individually with bottles 26, 28 which are initially fed to the equipment by a conveyor 30. The bottles meet a separator 32 which allows them to be moved individually by a bottle feeder 34 to a point where each bottle receives a label from a label carrier 36. The bottle is then controlled by a bottle drive system 38 which rolls the bottle to receive the label and then dispatches the bottle out of the equipment.

The strip 22 of labels is drawn by a label feeder assembly 40 which also includes a cutting head as will be described later. As the labels leave the feeder assembly 40 they are attached individually to the label carrier using a pneumatic vacuum system in the carrier 36. The labels then pass a glue applicator assembly 42 before being applied to bottles.

The general arrangement can also be seen in FIG. 2. In this view an end of the strip 22 has been captured by label carrier 36, and preceding labels 44, 46 are attached to the carrier under the influence of the vacuum system as will be described. A label 48 precedes label 46 and has almost completely separated from the carrier 36 in the course of application onto a bottle 50. Details of FIG. 2 will be described more fully in combination with subsequent views but at this point it is important to note that the peripheral speed of the portion of the label carrier 36 which receives the labels is slightly greater than the linear speed of the strip 22 to maintain some tension in the label as it transfers from the label feeder assembly 40 to the label carrier 36. Similarly, the bottle drive system 38 is arranged to move the periphery of the bottle slightly faster than the label is moving with the carrier 36. This again ensures tension in the label as it is transferred from the carrier 36 to the bottle 50.

For the sake of convenience the label feeder assembly 40 will be described in detail before then describing the label carrier 36 and bottle drive system 38. Other parts of the equipment will be described where they relate to the feeder assembly, label carrier, and drive system.

Figure 4:
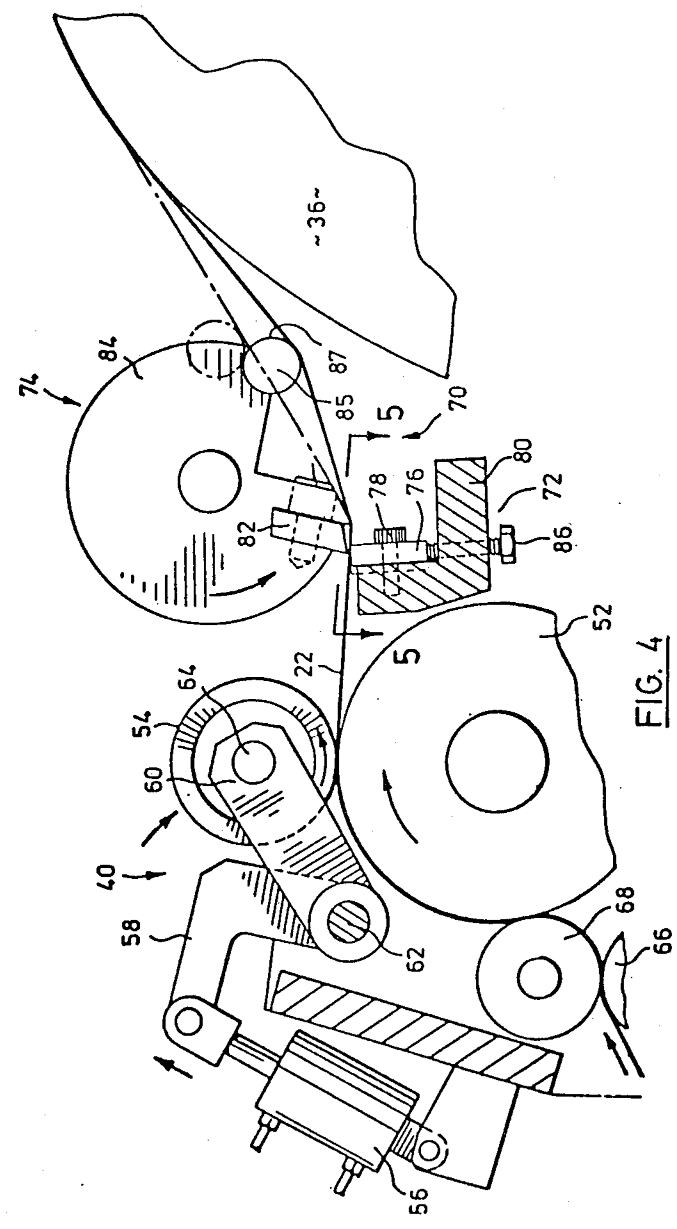
FIG. 4 is a further plan view showing a part of a label feeder assembly to a larger scale than that used in FIG. 2.
Figure 6:
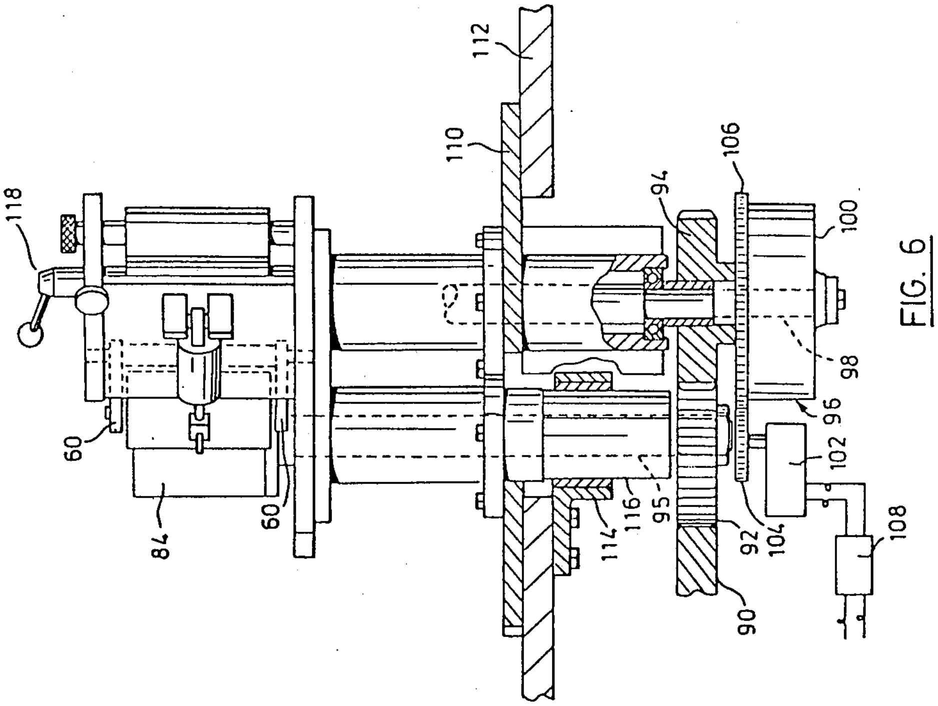
FIG. 6 is a side view of the label feeder assembly showing some parts in section.

Reference is next made to FIGS. 2, 4 and 6 with particular reference initially to FIG. 4 to describe the main components of the label feeder assembly 40. The strip 22 of labels is drawn into the label feeder assembly by a main or drive roll 52 combining with a rubber pinch roll 54 which is biased towards the main roll 52 by a pneumatic actuator 56 operating on the end of an L-shaped arm 58 which is in fixed relation with a pair of arms 60 and which pivots about an upright spindle 62. The arms 60 support a further spindle 64 about which the roll 54 is free to rotate. Consequently upon energizing the actuator 56 the pinch roll 54 is biased into engagement with the main roll 52 resulting in a driving force to progress the strip 22 through the assembly. The strip is also guided by idlers 66, 68 which both tend to remove any natural curl from the labels and also ensures that the strip is in good contact with the main roll 52 before the strip meets the pinch roll 54. The strip passes from the main roll 52 through a cutter assembly 70 and into engagement with the periphery of the carrier 36 where it is held by vacuum pads as will be described below. Because of the greater peripheral speed of the carrier 36, the strip slips relative to the carrier so that it is under tension. As seen in FIG. 4, the strip is moved from the main roll 52 into a position for severing into individual labels by a cutter assembly 70. This assembly consists of a stationary portion 72 and a rotating cutter head 74. The stationary portion 72 includes a blade 76 attached by screws 78 to a fixed bracket 80. The blade 76 can be aligned with a further blade 82 in a notched roll 84 using adjusting screws 86 before tightening screws 78 completely. The blade 82 is held in the notched roll 84 by screws 86.

Figure 5:
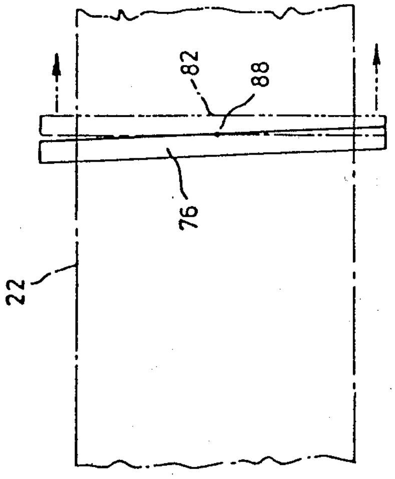
FIG. 5 is a view on line 5—5 of FIG. 4 to illustrate the operation of cutting blades used to sever individual labels from a strip of labels.

The arrangement of the blades 76 and 82 is such that the strip is cut progressively across the width of the strip as indicated in FIG. 5. Here it will be seen that the blade 76 is inclined to a vertical axis whereas the blade 82 is vertical. As shown, the strip is being cut at a point 88 and has already been cut up to that point running from the bottom to the top of the strip 22.

It has been found that the arrangement of blade 76 relative to blade 82 results in an improved cut because of the scissor action as the blades come together while the strip is moving past the blades.

The inclination of the blade to the vertical axis ensures a square edge is cut as the label passes through the cutter assembly 70 so that it is not necessary to interrupt movement of the label whilst it is being cut.

A cam lobe 85 is attached to the notched roll 84 in advance of the blade 82. The cam lobe 85 is positioned so that its peripheral surface 87 engages the strip 22 as it moves past the stationary blade 76. As may best be seen in FIG. 4, the strip 22 is deflected in its path so that the effective distance between the stationary blade 76 and the point of engagement of the strip with the carrier 36 is increased. Since the strip is firmly held by pinch wheel 54 and main roll 52, the strip will slide relative to the periphery of the carrier 36.

As the notched roll 84 continues to rotate, as indicated in chain dot lines in FIG. 4, the cam lobe 85 moves out of the path of the strip 22 so that there is a temporary slack in the strip 22. The cam lobe 85 is positioned so as to disengage the strip 22 as the blades 76, 82 complete the cut. Since the tension is momentarily released from the strip, the tendency to tear the label from the strip is reduced.

It will be apparent that the path of the strip may be modified so that the cam engages the strip over a reduced arc provided that sufficient slack is created in the label to permit the cut to be completed before the difference in speed between the carrier 36 and the main roll 52 again introduces tension in the label.

Turning now to FIG. 6, it will be seen that the parts described with reference to FIG. 4 are driven from a single input spur gear 90 (part of which is shown). The gear meshes with a second gear 92 which is in turn in mesh with a further gear 94. The gear 92 is attached to the lower end of a shaft 95 to drive the notched roll 84. Similarly, the gear 94 is attached to the planetary portion of an epicyclic gear box 96 to drive the sun gear which is attached to the lower end of a shaft 98 associated with the main roll 52 (FIG. 4). (For simplicity, the planetary gears and sun gear have been omitted from the drawing.) The epicyclic gear box 96 includes a housing 100 which for the moment can be considered to be stationary. As a result, drive from the intermediate gear 92 results in rotation of the shaft 98 which is attached to the main roll 52 (FIG. 4) to drive the strip 22.

The epicyclic gear box 96 permits differential movement between the shafts 95 and 98. If the housing 100 is stationary, then the shaft 98 will rotate at a speed dictated by the relationship between the planet and sun gears in the epicyclic gear box. However it is possible to either advance or retard the shaft 98 relative to the shaft 95 by turning the housing 100 about the axis of shaft 98. This is necessary because of the allowance in length of each label. If it is found that the labels are being cut either in advance or behind the desired cutting line, then adjustment can be made through a motor and gear box 102 which drives a pinion 104 in mesh with a ring gear 106 associated with housing 100. The motor and gear box is reversible and is driven via a control circuit 108 which receives a signal from a device which senses the location of a label to determine whether or not the cutter should be advanced or retarded in relation to the labels. The device senses a predetermined marking on the labels and produces a signal to move the motor and gear box in an appropriate direction to ensure the cutter engages the label at the required position. The structure shown in FIG. 6 has a particular advantage from the standpoint of adjustment and maintenance. It will be seen that the structure includes a plate 110 resting on a part 112 of the frame of the equipment. The structure is located relative to the part 112 by a bearing housing 114 attached to the part 112 and containing a cylindrical portion 116 of the structure. The plate 110 can slide on the part 112 and rotate about the axis of shaft 95 so that the assembly shown in FIG. 6 can be swung about this axis and into a position for more convenient adjustment and maintenance. This is also made possible by the fact that such movement takes place about the axis of the shaft 95 so that the engagement of the gears 92, 94 is not affected.

The assembly shown in FIG. 6 can be locked in position using a simple engagement fitting controlled by a handle 118 and with the structure locked in position by this handle it assumes the position shown in FIGS. 1 and 2. Such movement is particularly useful for adjusting the blade 76 (FIG. 4) of the stationary portion 72 of the cutter assembly 70. It will be appreciated that the spur gear 90 shown in FIG. 6 is driven through a suitable drive chain from a bull gear 121 shown at the bottom of FIG. 7. It will become apparent that this ensures that the label carrier 36 shown in FIG. 1 is driven synchronously with the notched roll 84. The reason for this will become evident from subsequent description.

Returning to FIG. 2. the label carrier 36 consists essentially of a large wheel having a discontinuous periphery. Four raised peripheral pads 120, 122, 124 and 126 are provided spaced equally about the periphery of the wheel. As will be described with reference to FIG. 7, these pads are provided with openings connected to a vacuum system to hold labels such as labels 44 and 46 on the pads.

FIG. 2 shows a label 129 which is projecting outside the label feeder assembly 40, but has yet to be severed from the strip 22. It will be seen that the leading edge of the label projects beyond the leading end of the pad 126 whereas the label 44 which has been severed from the strip sits on the pad and does not overhang the pad. This is because the wheel is made to move with sufficient peripheral speed that it creates slippage between the pad 126 and the label 129. Because the vacuum system maintains the label in contact with the pad, a tension exists in the label and this ensures that the label is drawn into firm engagement with the pad. When the label is severed from the strip, it will have slipped on the wheel to a point where the leading end of the label lies immediately adjacent the leading end of the pad 126. As soon as the label is severed it will be drawn onto the pad and take up a position such as that shown for label 44. This process continues as the severed label progresses with the wheel past the glue applicator assembly 42. Here glue is applied in a conventional manner, the applicator assembly being controlled to move out of engagement with the wheel should there be no label on the pad. This control will be described subsequently.

Figure 3:
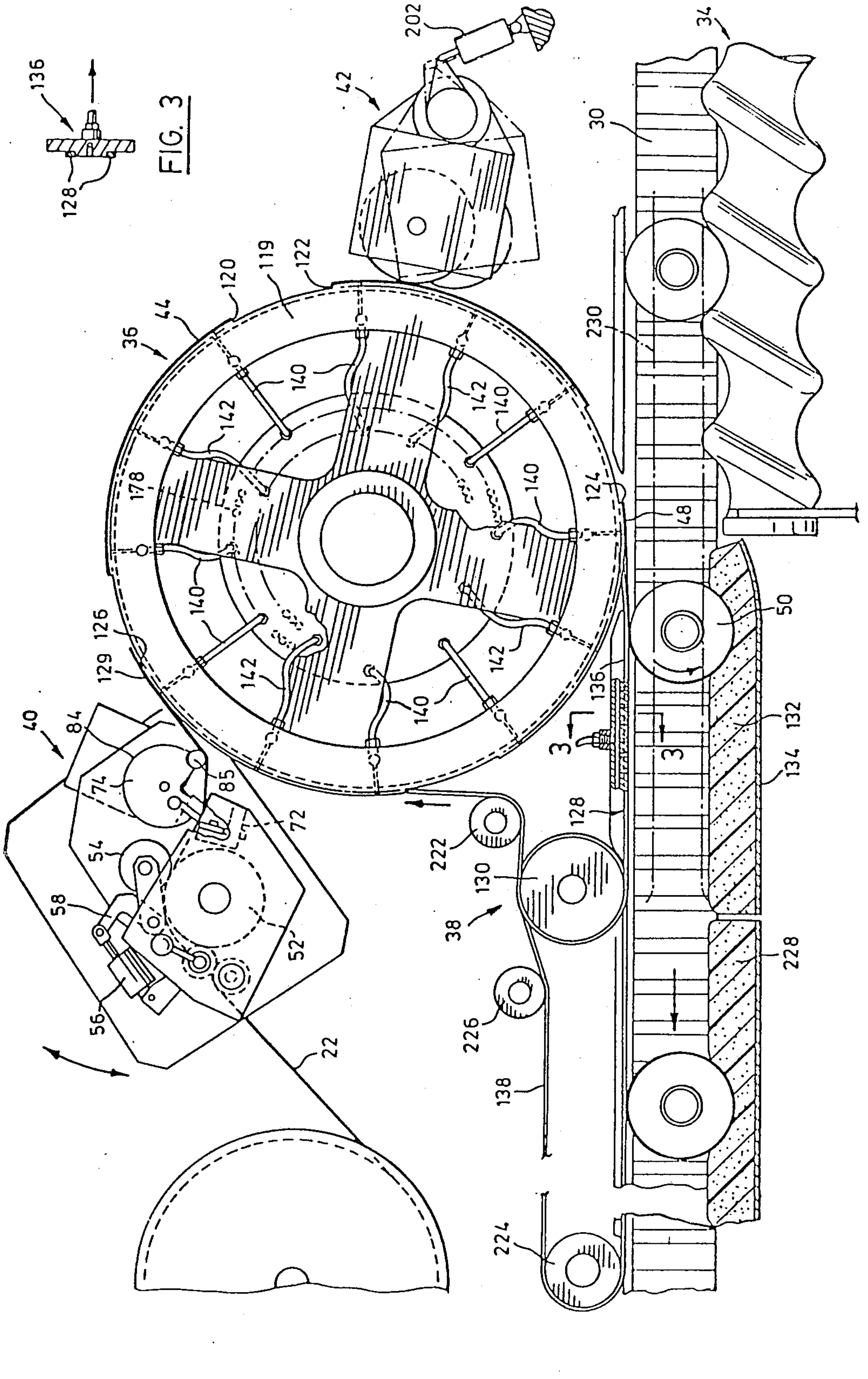
FIG. 3 is a sectional view on line 3—3 of FIG. 2 showing a portion of the equipment.
Figure 7:
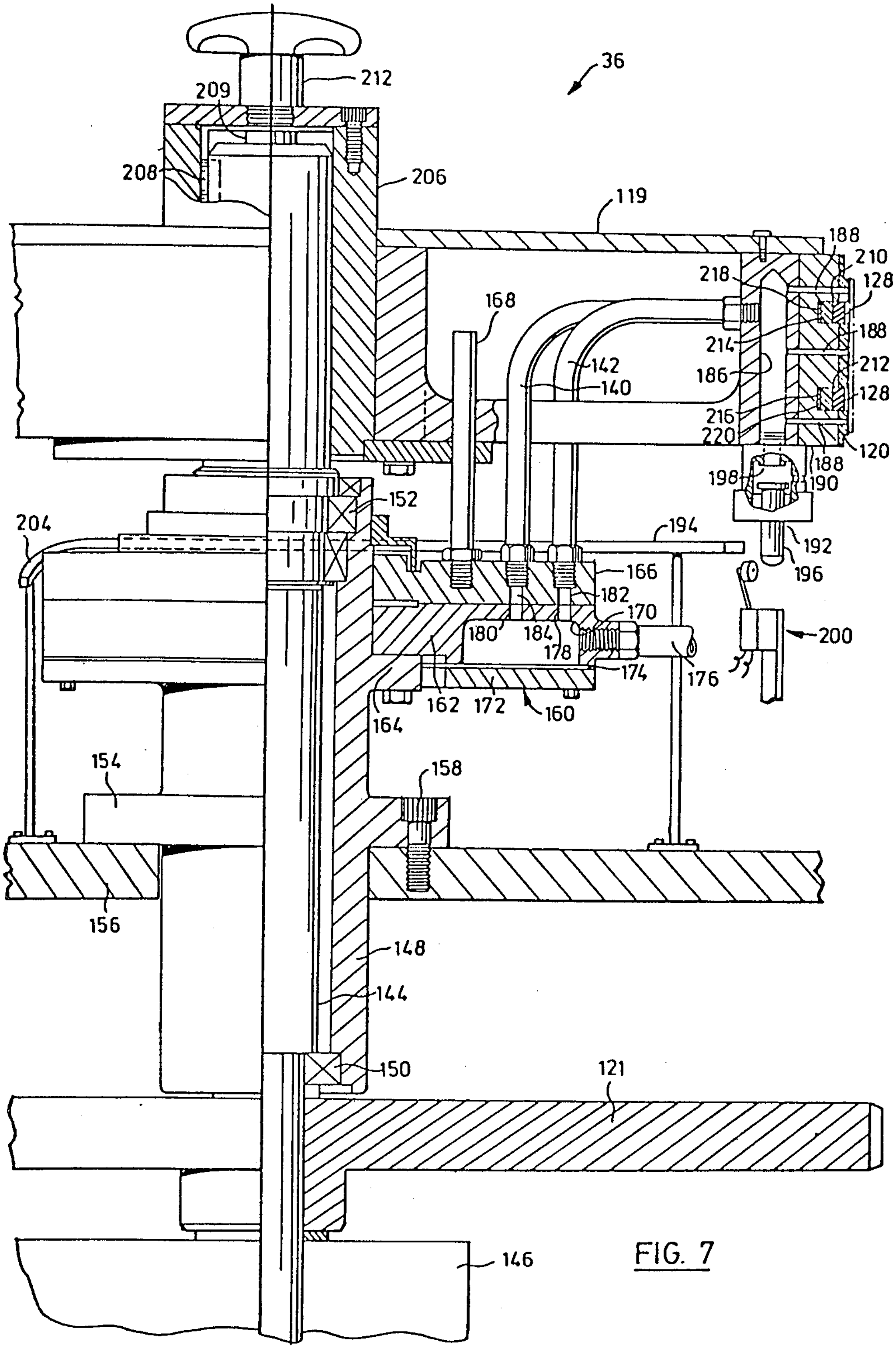
FIG. 7 is a compound view of a label carrier which receives labels from the label feeder assembly, the right half being in section and the left half being generally an elevation.

After a label such as label 46 has passed the applicator assembly 42 a leading end is stripped off the wheel by a pair of belts 128 (one of which is seen in FIG. 2 and both of which can be seen in FIG. 7). These belts pass around the wheel 119 driven by a roll 130 which causes a linear velocity in the belts greater than the peripheral velocity of the wheel 119. Conventional bottle feeder 34 is driven also from the bull gear 121 (FIG. 7) to cause bottles to be in position to receive labels from the wheel 119. The bottle 50 for instance has reached a reaction pad 132 supported by a wall 134 and is biased into contact with the belt 128 so that the bottle is driven linearly along the conveyor 30 at half the speed of the belt. The belt guides the leading edge of the label into contact with the outer surface of the bottle 50 which is moving faster than the label, so that as soon as the adhesive on the label comes into contact with the bottle, the label begins to adhere to the bottle and is pulled off the wheel while maintaining sliding engagement with the associated one of the raised pads on the wheel. This tension ensures an even and controlled application of the label as the bottle rolls in contact with the pad 132. However, because some labels are particularly long, an auxiliary vacuum pad 136 is provided to further support the label after it has slid off the pad 132 and before it is applied completely to the bottle 50. This will be better understood with reference to FIG. 3 which shows a sectional view through the auxiliary vacuum pad 136. Once the label has been applied the bottle is driven along at about the speed of the conveyor by a further single belt 138 which is also driven by the roll 130.

Returning now to the details of construction of the label carrier 36, it is evident from FIG. 2 that the wheel 119 includes two groups of vacuum pipes, an outer group 140 and an inner group 142. It will be seen that the outer pipes 140 serve the ends of the labels whereas the inner pipes 142 serve the centres of the labels. With this arrangement it is possible to release or more positively secure the centre of the label independently of the ends and vice versa.

Reference is next made to FIG. 7 to describe the structure of the label carrier 36. The carrier rotates about an axis defined by a vertical shaft 144 driven from a main drive and gear box 146. The bull gear 121 is attached to the shaft 144 and drives all of the other parts of the equipment through a conventional drive chain.

The shaft 144 passes through a bearing housing 148 and is supported at ends of the housing by suitable bearings 150, 152 which include a thrust bearing. The bearing housing 148 includes a flange 154 sitting on a part 156 of the frame of the equipment and attached by suitable bolts 158.

The bearing housing 148 also supports a vacuum distributor 160 having a lower part 162 fixed to the bearing housing by a further flange 164 and an upper or movable portion 166 which rotates with the wheel 119 driven by a pin 168 as will be described. The portions 162 and 166 are machined to define smooth faces in engagement with one another to facilitate the upper portion riding on the lower portion as the upper portion rotates.

The lower portion 162 defines an annular recess 170 covered by a plate 172 and seal 174. These parts combine to define an annular manifold served by a vacuum connection 176. This manifold then serves the pipes 140, 142 by way of concentric rows of openings 178, 180 in the fixed part 162 and corresponding openings 182, 184 associated with the pipes 140, 142. The openings 178, 180 extend partially about the part 162 as illustrated in broken outline in FIG. 2. Consequently, as the wheel 119 rotates the openings 182, 184 are affected by vacuum when they coincide with openings 178, 180. It will be evident that the size of openings 178, 180 can be varied to provide different degrees of vacuum in the pipes 140, 142 as the wheel 119 rotates.

Each of the pipes 140, 142 terminates at its upper extremity in a fitting which connects the pipe to one of a series of upright bores 186. Each of these bores acts as a manifold to a series of radial openings 188 for drawing air from the front of one of the raised pads such as pad 120. A label is shown in ghost outline fixed to such a pad. In fact, these pads are preferably of an elastomeric material bonded to an outer ring 190 which is made up of two halves and attached to the main body of the wheel.

Each of the bores 186 is associated with the pipes 140 at the leading end of a label has a vacuum sensor 192 at its lower end. This sensor normally rides on a track 194 until it passes a point at which a label should be picked up. In the event that a label is picked up there will be a build up of negative pressure in the bore 186 which will retain a loose plunger 196 against a seat 198 to thereby seal the bore 186. The plunger 196 will then be in a raised position and as the wheel 119 rotates the plunger will pass above an electrical switch 200. However, in the event that a label is not supplied to the wheel for some reason there will be insufficient vacuum built up in the bore 186 to maintain the plunger in its upper position and it will then drop off the end of the track into the position shown in FIG. 7. As the wheel rotates the plunger will contact the switch 200 and this switch will be used to energize an actuator 202 (FIG. 2) associated with the glue applicator assembly 42. Energizing this actuator results in moving the applicator assembly away from the wheel to avoid applying glue to the wheel in the absence of a label.

After the plunger 196 has met the switch 200, it will continue in the dropped or lower position until it reaches an incline 204 at a leading end of the track 194 which raises the plunger back to a position in which it engages seat 198.

The wheel 119 includes a central boss 206 which locates on an upper extremity of the shaft 144 and is engaged on the shaft by a key 208. An extension 209 on the upper extremity of the shaft is threaded to receive a knob 212 which retains the wheel on the shaft. It will be evident that once the knob is removed it is possible to disconnect the pipes 140, 142 and to lift the wheel off the equipment. Once this is done the distributor can be removed so that it is quite simple to service the equipment and to change parts if this is necessary for different labels.

Returning to the operation of the equipment, in the position shown in FIG. 2, pipe 140 adjacent label 128 is applying vacuum and has picked up the forward end of the label. As the wheel 119 rotates this label remains in contact although it will slide on the wheel until the label is separated from the strip 22. At this point it will have dropped back from label 44 by the amount of the space between pads 126 and 120 and will then effectively take up a position similar to that shown for label 44. Because a label has been attached to the wheel, the sensor 192 (FIG. 7) will fail to touch the switch 200 so that glue will be applied to the label as it continues to move into position for application to a bottle. It should be noted that it is possible with the arrangement of pipes 140, 142 to apply more vacuum at the centre of the label during gluing if required and in fact to vary the vacuum effect on the label by changing the sizes of the holes in the parts of the distributor serving the pipes. As mentioned earlier, the leading end of the label is stripped from the wheel by the belts 128 and at this point vacuum is no longer applied to the leading end of the label. Also, at this point the label becomes attached to a bottle and in order to simplify slippage of the label on the wheel it is preferable to discontinue vacuum through the pipe 142 to the centre of the label and to rely on vacuum on the trailing edge of the label through one of the pipes 140. Thus the holes 180 terminate at a position corresponding to the circumferential position of the conduit 140 just after the leading edge of the label is detached from the suction pad. The initial contact between the label and the bottle takes place just where the belt leaves the wheel and the differential speed between the belt and the wheel ensures tension in the label. This differential speed is achieved using a particular arrangement of belt engagement on the wheel 119 as will be described.

Reference is again made to FIG. 7 to describe the parts of the wheel 119 associated with containing the belts 128. These belts sit in respective recesses 210, 212 in radial engagement with slip rings 214, 216 made up in segments and of a low friction plastic material such as polytetrafluoroethylene. In turn, these slip rings are in radial engagement with brass wear strips 218, 220 which are also positioned in the ring 190 at the bottom of the respective recesses 210, 212. As a result of this arrangement the belts 128 can be driven at a linear speed greater than the peripheral speed of the wheel without interfering with the labels before they are ready to be stripped from the wheel. However, as soon as a label is stripped off the wheel and in engagement with a bottle, the speed of the label becomes that of the belt thereby ensuring tension in the label as it is stripped off the wheel.

The belts 128 are driven continuously by roll 130 which in turn is driven from the bull gear 121 (FIG. 7) through suitable drive members. Tension is maintained in the belt by an idler 222 and, as mentioned earlier, the single belt 138 is also driven by the roll 130. This belt passes around an idler 224 and tensioning idler 226 so that the belts 128 and 138 combine to roll the bottles along the reaction pad 132 and subsequent pad 228 with a linear velocity substantially equal to that of the conveyor 30. Guides 230 are shown in ghost outline to support the bottles at the neck and to limit the possibility of the bottles being toppled by engagement with the label etc.

What we claim our invention is:

1. For use in a machine having a feed mechanism to feed a strip of material along a predetermined path and into engagement with a, transport device a cutter assembly located in said path for severing said strip of sheet material, into discrete pieces to be carried by said transport device said cutter assembly comprising:

a fixed support, a first knife element attached to said fixed support to extend transverse to said strip, a rotatable knife carrier mounted for rotation about a first axis, a second knife element attached to said rotatable knife carrier for movement therewith, drive means to rotate said rotatable knife carrier about said first axis and move said second knife element past said first knife element to produce a cutting action, said knife elements diverging in the direction of travel of said second knife element to provide progressive severing of said strip of sheet material in a direction transverse to the strip, and cam means associated with said rotatable knife carrier and moveable into said path to engage said strip of sheet material and during a latter part of said cutting action out of said path to disengage said strip whereby tension is removed from the strip between said cutter assembly and said label carrier during the latter part of said cutting action.

2. The cutter assembly according to claim 1 wherein said cam means is mounted on said rotatable knife carrier for movement therewith.

3. The cutter assembly according to claim 2 wherein said cam means moves into said path to engage said strip after commencement of said cutting action.

4. The cutter assembly according to claim 2 wherein said cam means is a lobe mounted on said carrier in advance of said second knife element, said lobe including a peripheral portion to engage said strip, said peripheral portion and said knife. element being located equidistant from said first axis.

5. The cutter assembly according to claim 4 wherein said knife carrier is relieved intermediate said lobe and said second knife element to prevent engagement with said strip.

6. The cutter assembly according to claim 2 wherein said first knife element is inclined to said first axis.

7. The cutter assembly as set forth in claim 1, wherein said strip of sheet material is a strip of labels.

8. The combination of a labelling machine having a feed mechanism to feed a strip of labels moving along a predetermined label path and into engagement with a label carrier, and a cutter assembly located in said path for severing labels from said strip, said cutter assembly comprising:

a fixed support, a first knife element attached to said fixed support to extend transverse to said strip, a rotatable knife carrier mounted for rotation about a first axis, a second knife element attached to said rotatable knife carrier for movement therewith, drive means to rotate said rotatable knife carrier about said first axis and move said second knife element past said first knife element to produce a cutting action, said knife elements diverging in the direction of travel of said second knife element to provide progressive severing of said strip in a direction transverse to the strip, and cam means associated with said rotatable knife carrier and moveable into said path to engage said strip and during a latter part of said cutting action out of said path to disengage said strip, whereby tension is removed from the strip between said cutter assembly and said label carrier during the latter part of said cutting action.

9. The combination of a labelling machine and a cutter assembly according to claim 8 wherein said cam means is mounted on said rotatable knife carrier for movement therewith.

10. The combination of a labelling machine and a cutter assembly according to claim 9 wherein said cam means moves into said path to engage said strip after commencement of said cutting action.

11. The combination of a labelling machine and a cutter assembly according to claim 9 wherein said cam means is a lobe mounted on said carrier in advance of said second knife element, said lobe including a peripheral portion to engage said strip, said peripheral portion and said knife element being located equidistant from said first axis.

12. The combination of a labelling machine and a cutter assembly according to claim 11 wherein said knife carrier is relieved intermediate said lobe and said second knife element to prevent engagement with said strip.

13. The combination of a labelling machine and a cutter assembly according to claim 9 wherein said first knife element is inclined to said first axis.

* * * * *